F. M. REMMEK.
SHAFT CONSTRUCTION.
APPLICATION FILED OCT. 15, 1908.
931,488.
Patented Aug. 17, 1909.
2 SHEETS—SHEET 1.
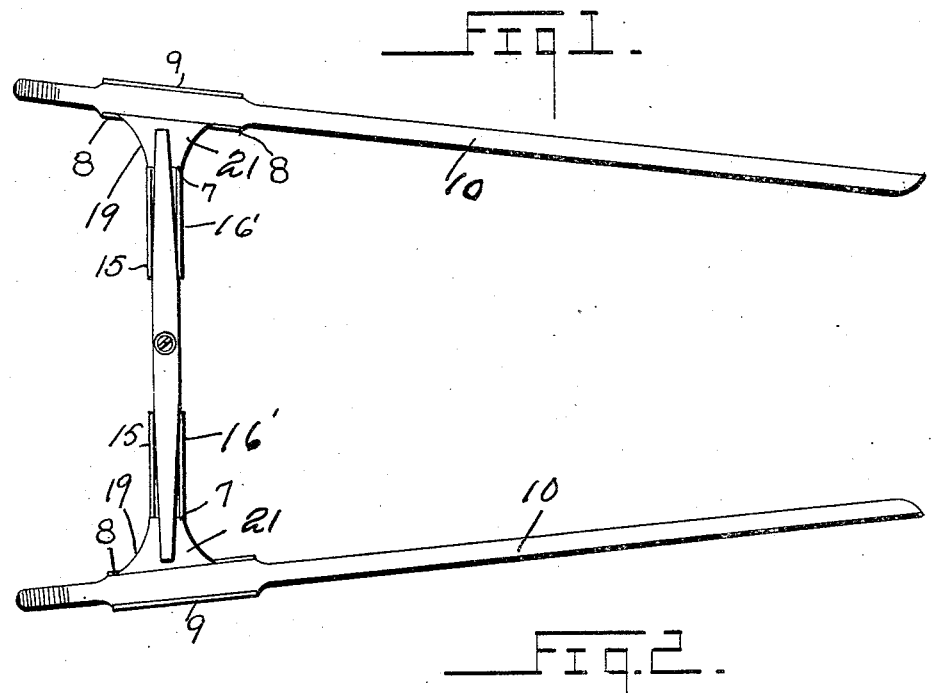
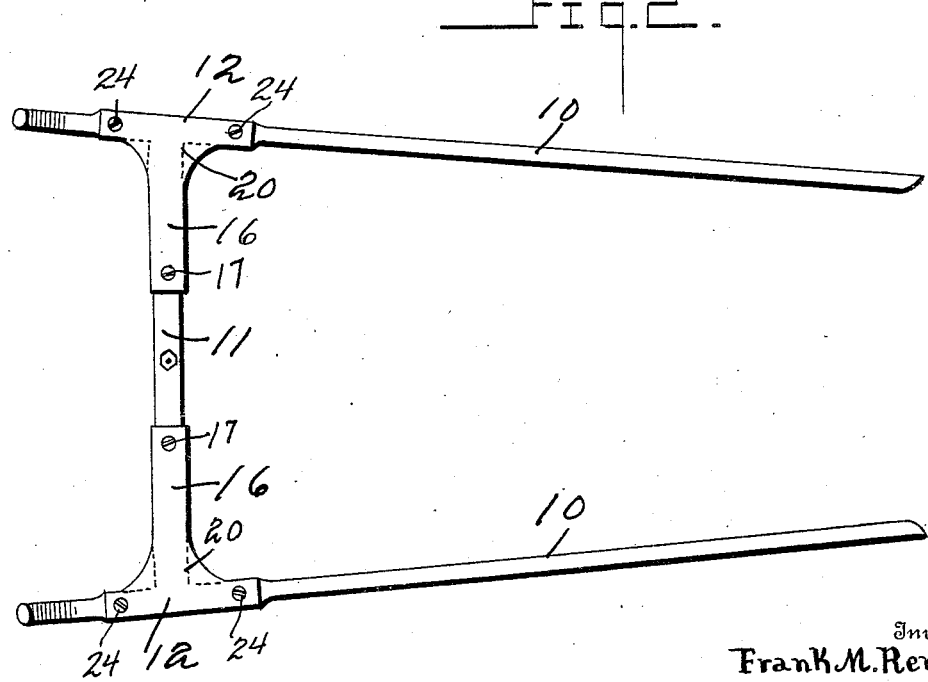
Inventor
Frank M. Remmek
Witnesses
E. E. Johansen
E. L. Chandlee
By Woodward & Chandlee
Attorney

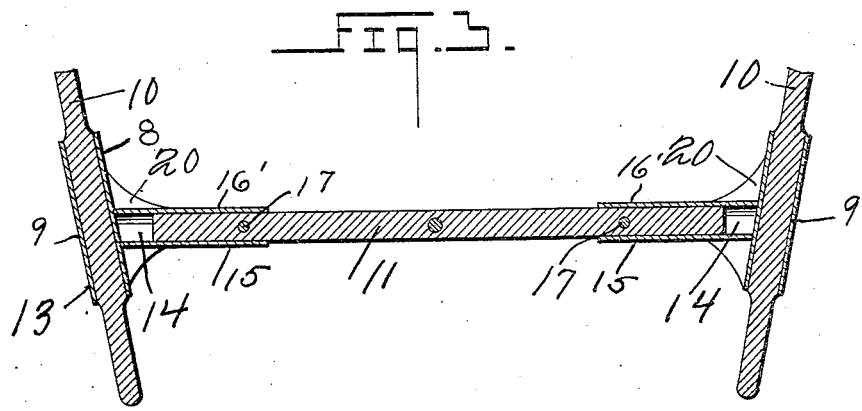
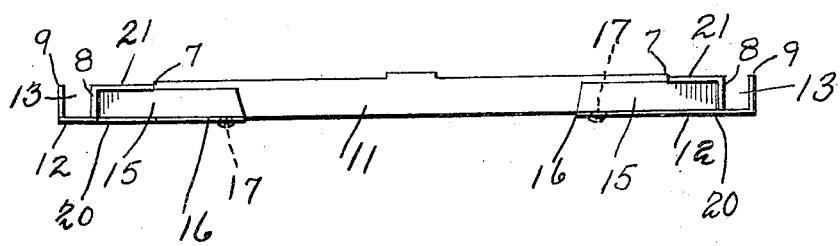

UNITED STATES PATENT OFFICE.

FRANK M. REMMEK, OF INDIANAPOLIS, INDIANA.

SHAFT CONSTRUCTION.

No. 931,488.      Specification of Letters Patent.      Patented Aug. 17, 1909.

Application filed October 15, 1908. Serial No. 457,942.

*To all whom it may concern:*

Be it known that I, FRANK M. REMMEK, a citizen of the United States, residing at Indianapolis, in the county of Marion and State of Indiana, have invented certain new and useful Improvements in Shaft Construction, of which the following is a specification.

This invention relates to carriages and wagons, and more particularly to shafts, and has for an object to provide a particularly desirable method of constructing shafts. A particular object of the device is to provide a device for connecting the shafts with the usual cross-bar therebetween, and adapted to allow the quick disengagement of shafts therefrom, so that they may be easily replaced without requiring an experienced workman.

Another important object of the device is to provide a shaft construction in which the parts may be shipped in compact order and assembled by the purchaser, which could not well be done with ordinary shafts, on account of the complicated methods of assembling.

A further object of the device is to provide a joint strongly braced against loosening under oscillation and differential longitudinal movement of the shafts which is one of the principal faults with previous similar constructions. Another object is to provide such a joint adapted to be secured to the shaft without danger of causing the splitting of the wood when put under severe strain incident to use.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a top plan view of the device, Fig. 2 is a bottom view of the device, Fig. 3 is a horizontal cross sectional view of the device, Fig. 4 is a rear view of the device with the shaft disengaged therefrom.

In carrying out the aim of my invention I use two similar unions, each comprising a main plate 12, and a cross plate 16, approximately of equal width and length as shown in the bottom view in Fig. 2. These plates are integrally formed and in outline are T-shaped, and extending at right angles from the main plate 12 and running the full length of said plates, are the flanges 8 and 9 as disclosed in Fig. 1. These flanges are held in parallel spaced relation, and extending upwardly at right angles to the cross plate 16, are the two parallel flanges 15 and 16' also held in parallel spaced relation as clearly disclosed in the top view in Fig. 1. These cross flanges also extend the full length of the cross plates, the inner ends of these flanges 15 and 16' however being secured to the inner flanges 8 as shown. These flanges all extend upward an equal height or distance.

As shown in Fig. 1, a top plate 21 covers said cross flanges 15 and 16' for a distance approximately half the length of said flanges, the outer ends of said top plates being flared and secured to the adjoining main flanges 8. The edges of said top plate are slightly curved, as shown at 19 in Fig. 1. The ends 7 of these top plates form stop edges against which the ends of the cross bar 11 are stopped and abut as is shown in Fig. 4.

Two approximately triangular webs 20 as shown in Fig. 3 connect said cross plates 16 to the main plate 12, said webs ending intermediate of the ends of said plates as shown. The main as well as the cross plates are provided with suitable bolt openings as shown. The main flanges 8 and 9 form a channel 13 within which the shafts 10 are held while the flanges 15 and 16' form a channel 14 within which the cross bar 11 is held.

As may be seen, it is only necessary to use one bolt 17 in each connection to secure the cross-bar therein, and but two bolts 24 to hold the shafts engaged in their respective channels.

It will be seen that lateral strain on the shafts cannot produce any tendency to split the wood because of the bolt holes therethrough, as the opposite walls of the channels confine the shafts closely and serve to reinforce them.

It will be seen also that the shafts are rigidly held in their proper relation to the cross-bar, and the cross-bar itself is securely sustained by the joints.

It will be seen that the device is adapted to be manufactured at a low cost, and is adapted to facilitate the shipment and assembling of such devices.

What is claimed is:—

The herein described shaft construction having in combination, two shafts, two T-shaped unions each comprising a main plate and a cross plate of approximately equal width and length, said plates being integrally formed, two parallel flanges extending the full length of said main plates and at right angles thereto, two parallel flanges extending at right angles from said cross plates the full length thereof and being secured and forming a part of the adjacent main flange, all of said flanges being of an equal height, a top plate covering said cross flanges for a distance approximately half their length, the inner ends of said top plates forming stop edges, said top plates being flared outward and secured to the adjoining main flange, an approximately triangular web connecting said cross plate near its base to these main plates, said webs ending intermediate of the ends of said plates, said shafts being secured between said main flanges, and a cross bar held between said cross flanges having its ends stopped against the edges of said top plates, as and for the purpose set forth.

In testimony whereof I affix my signature, in presence of two witnesses.

FRANK M. REMMEK.

Witnesses:
 ROSE M. REMMEK,
 JOHN C. F. LASER.